United States Patent
Wang et al.

(10) Patent No.: US 10,410,292 B2
(45) Date of Patent: Sep. 10, 2019

(54) METHOD, SYSTEM, APPARATUS, AND STORAGE MEDIUM FOR REALIZING ANTIFRAUD IN INSURANCE CLAIM BASED ON CONSISTENCY OF MULTIPLE IMAGES

(71) Applicant: PING AN TECHNOLOGY (SHENZHEN) CO., LTD., Shenzhen (CN)

(72) Inventors: Jianzong Wang, Shenzhen (CN); Hongjie Li, Shenzhen (CN); Jing Xiao, Shenzhen (CN)

(73) Assignee: Ping An Technology (Shenzhen) Co., Ltd., Shenzhen (CN)

( * ) Notice: Subject to any disclaimer, the term of this patent is extended or adjusted under 35 U.S.C. 154(b) by 61 days.

(21) Appl. No.: 15/736,352

(22) PCT Filed: Jan. 16, 2017

(86) PCT No.: PCT/CN2017/071318
§ 371 (c)(1),
(2) Date: Dec. 14, 2017

(87) PCT Pub. No.: WO2017/124990
PCT Pub. Date: Jul. 27, 2017

(65) Prior Publication Data
US 2018/0182039 A1   Jun. 28, 2018

(30) Foreign Application Priority Data
Jan. 22, 2016   (CN) .......................... 2016 1 0046584

(51) Int. Cl.
*G06Q 40/00* (2012.01)
*G06Q 40/08* (2012.01)
(Continued)

(52) U.S. Cl.
CPC ............. *G06Q 40/08* (2013.01); *G06F 19/00* (2013.01); *G06K 9/4609* (2013.01);
(Continued)

(58) Field of Classification Search
None
See application file for complete search history.

(56) References Cited

U.S. PATENT DOCUMENTS 8,712,893 B1 * 4/2014 Brandmaier ........ G06F 17/3028
705/35
2002/0051577 A1 * 5/2002 Kinjo .................... G06T 1/0028
382/218
(Continued)

FOREIGN PATENT DOCUMENTS

| CN | 101467153 A | 6/2009 |
| CN | 104680515 A | 6/2015 |
| CN | 105719188 A | 6/2016 |

*Primary Examiner* — Jason Borlinghaus

(57) ABSTRACT

The provided method includes: classifying damage assessing images of a same vehicle portion into one same image set; obtaining keypoint features of each image set, diving every two damage assessing images in each image set into one image group, matching multiple relevant keypoints from the damage assessing images in each image group; calculating a feature point transform matrix of each image, and converting one of the two damage assessing images in each image group to a to-be-verified image which has the same shooting angle as the other damage assessing image in the image group; matching feature parameters of the to-be-verified image with those of the other damage assessing image in the same image group; and generating reminder information, when there are unmatched parameters, to remind the user of frauds of the damage assessing images received from the terminal.

12 Claims, 5 Drawing Sheets

(51) Int. Cl.
*G06F 19/00* (2018.01)
*G06K 9/46* (2006.01)
*G06K 9/62* (2006.01)
*G06T 7/00* (2017.01)
*G06T 7/33* (2017.01)

(52) U.S. Cl.
CPC ........... G06K 9/4671 (2013.01); G06K 9/628 (2013.01); G06K 9/6211 (2013.01); G06K 9/6268 (2013.01); G06T 7/0002 (2013.01); G06T 7/33 (2017.01); G06K 9/6256 (2013.01); G06T 2207/10012 (2013.01); G06T 2207/30236 (2013.01); G06T 2207/30248 (2013.01)

(56) References Cited

U.S. PATENT DOCUMENTS

2010/0113091 A1\* 5/2010 Sharma ................ G06K 9/4642
 455/556.1
2010/0289878 A1\* 11/2010 Sato .................... H04N 13/239
 348/46
2013/0124414 A1 5/2013 Roach et al.

\* cited by examiner

US 10,410,292 B2

METHOD, SYSTEM, APPARATUS, AND STORAGE MEDIUM FOR REALIZING ANTIFRAUD IN INSURANCE CLAIM BASED ON CONSISTENCY OF MULTIPLE IMAGES

CROSS REFERENCE OF RELATED APPLICATIONS

The present application is the national phase entry of international application no. PCT/CN2017/071318, filed on Jan. 16, 2017, which claims the benefit of priority from Chinese Application No. 201610046584.5, filed on Jan. 22, 2016, the entire content of which is incorporated herein in its entirety.

TECHNICAL FIELD

The present disclosure relates to fields of financial service, and more particularly, to a method, a system, an apparatus, and a storage medium for realizing antifraud in insurance claim based on consistency of multiple images.

BACKGROUND

At present, in the industry of vehicle insurance, manual detections are required for determining whether images showing the vehicle damage have been tampered with. However, manual detections are time consuming and inefficient and inaccurate. In addition, with the development of the Photoshop technology, tampered images cannot be observed directly by eyes of a human being, especially when there are multiple images to be detected and the tampered regions on the images are not determined.

SUMMARY

The present disclosure provides a method, a system, an apparatus, and a storage medium for realizing antifraud in insurance claim based on consistency of multiple images.

The method for realizing antifraud in insurance claim based on consistency of multiple images, includes:
  receiving multiple damage assessing images taken from different shooting angles uploaded by a user from a terminal;
  analyzing a vehicle portion in each damage assessing image using an analyzing model and classifying the damage assessing images, such that the damage assessing images showing the same vehicle portion are classified into one image set;
  detecting keypoints in each damage assessing image in each image set to obtain keypoint features of the vehicle portion corresponding to the image set;
  classifying every two damage assessing images into one image group, matching the keypoint features corresponding to each image set with the keypoints in the damage assessing images in each image group of the same image set according to a keypoint matching algorithm, to obtain at least one group of relevant keypoints for the damage assessing images in each image group;
  according to the relevant keypoints corresponding to each image group, calculating a keypoint transformation matrix corresponding to each image group using a linear equation, and converting one of the two damage assessing images in each image group to a to-be-verified image which has the same shooting angle as the other damage assessing image in the image group;
  matching a feature parameter of the to-be-verified image with that of the other damage assessing image in the same image group; and
  generating reminder information, when the feature parameter of the to-be-verified does not match with that of the other damage assessing image in the image group, to remind the user of frauds of the damage assessing images received from the terminal.

The system for realizing antifraud in insurance claim, includes:
  an image receiving module, configured to receive multiple damage assessing images taken from different shooting angles uploaded by a user from a terminal;
  a classifying module, configured to analyze a vehicle portion in each damage assessing image using an analyzing model and classifying the damage assessing images, such that the damage assessing images showing the same vehicle portion are classified into one image set; a keypoint detecting module, configured to detect keypoints in each damage assessing image in each image set to obtain keypoint features of the vehicle portion corresponding to the image set;
  a rebuilding module, configured to classify every two damage assessing images into one image group, matching the keypoint features corresponding to each image set with the keypoints in the damage assessing images in each image group of the same image set according to a keypoint matching algorithm, to obtain at least one group of relevant keypoints for the damage assessing images in each image group, and calculate, according to the relevant keypoints corresponding to each image group, a keypoint transformation matrix corresponding to each image group using a linear equation; and
  a verifying module, configured to convert one of the two damage assessing images in each image group to a to-be-verified image which has the same shooting angle as the other damage assessing image in the image group by using the corresponding keypoint transformation matrix, match a feature parameter of the to-be-verified image with that of the other damage assessing image in the image group, and generate reminder information, when the feature parameter of the to-be-verified does not match with that of the other damage assessing image in the image group, to remind that user of frauds of the damage assessing images received from the terminal.

The apparatus for realizing antifraud in insurance claim, includes a processing unit, an input/output unit, a communication unit, and a storage unit;
  wherein the input/output unit is configured to receive instructions from a user and output response of the apparatus to the instructions input by the user;
  the communication unit is configured to communicate with a pre-determined terminal or a server;
  the storage device is configured to store a system for realizing antifraud in insurance claim and operation data of the system;
  the processing unit is configured to execute the system to perform following steps:
    receiving multiple damage assessing images taken from different shooting angles uploaded by a user from a terminal;
    analyzing a vehicle portion in each damage assessing image using an analyzing model and classifying the damage assessing images, such that the damage assessing images showing the same vehicle portion are classified into one image set;

detecting keypoints in each damage assessing image in each image set to obtain keypoint features of the vehicle portion corresponding to the image set;

classifying every two damage assessing images into one image group, matching the keypoint features corresponding to each image set with the keypoints in the damage assessing images in each image group of the same image set according to a keypoint matching algorithm, to obtain at least one group of relevant keypoints for the damage assessing images in each image group;

according to the relevant keypoints corresponding to each image group, calculating a keypoint transformation matrix corresponding to each image group using a linear equation, and converting one of the two damage assessing images in each image group to a to-be-verified image which has the same shooting angle as the other damage assessing image in the image group;

matching a feature parameter of the to-be-verified image with that of the other damage assessing image in the same image group; and generating reminder information, when the feature parameter of the to-be-verified does not match with that of the other damage assessing image in the image group, to remind the user of frauds of the damage assessing images received from the terminal.

The computer-readable storage medium stores one or more programs which can be executed by one or more processors to perform following steps:

receiving multiple damage assessing images taken from different shooting angles uploaded by a user from a terminal;

analyzing a vehicle portion in each damage assessing image using an analyzing model and classifying the damage assessing images, such that the damage assessing images showing the same vehicle portion are classified into one image set;

detecting keypoints in each damage assessing image in each image set to obtain keypoint features of the vehicle portion corresponding to the image set;

classifying every two damage assessing images into one image group, matching the keypoint features corresponding to each image set with the keypoints in the damage assessing images in each image group of the same image set according to a keypoint matching algorithm, to obtain at least one group of relevant keypoints for the damage assessing images in each image group;

according to the relevant keypoints corresponding to each image group, calculating a keypoint transformation matrix corresponding to each image group using a linear equation, and converting one of the two damage assessing images in each image group to a to-be-verified image which has the same shooting angle as the other damage assessing image in the image group;

matching a feature parameter of the to-be-verified image with that of the other damage assessing image in the same image group; and generating reminder information, when the feature parameter of the to-be-verified does not match with that of the other damage assessing image in the image group, to remind the user of frauds of the damage assessing images received from the terminal.

With the method, system, apparatus, and storage medium for realizing antifraud in insurance claim based on consistency of multiple images provided in the present disclosure, in the damage assessment of the vehicle, the owner of the vehicle or the repairing garage takes multiple damage assessing images of the vehicle portion from different shooting angles; after the damage assessing images are compared and spatial transformations are performed, whether the vehicle portions in the damage assessing images are identical to each other or not can be determined, thus, the situation that the owner of the vehicle or the repairing garage exaggerates the damage for cheating on the insurance by tampering with the images can be prevented.

BRIEF DESCRIPTION OF THE DRAWINGS

The present disclosure will be described in more detail with reference to the accompany drawings and the embodiments, wherein in the drawings.

DETAILED DESCRIPTION OF THE INVENTION

For clearly understanding technical features, purpose, and effect of the present disclosure, embodiments are given in detail hereinafter with reference to the accompanying drawings.

Figure 1A:
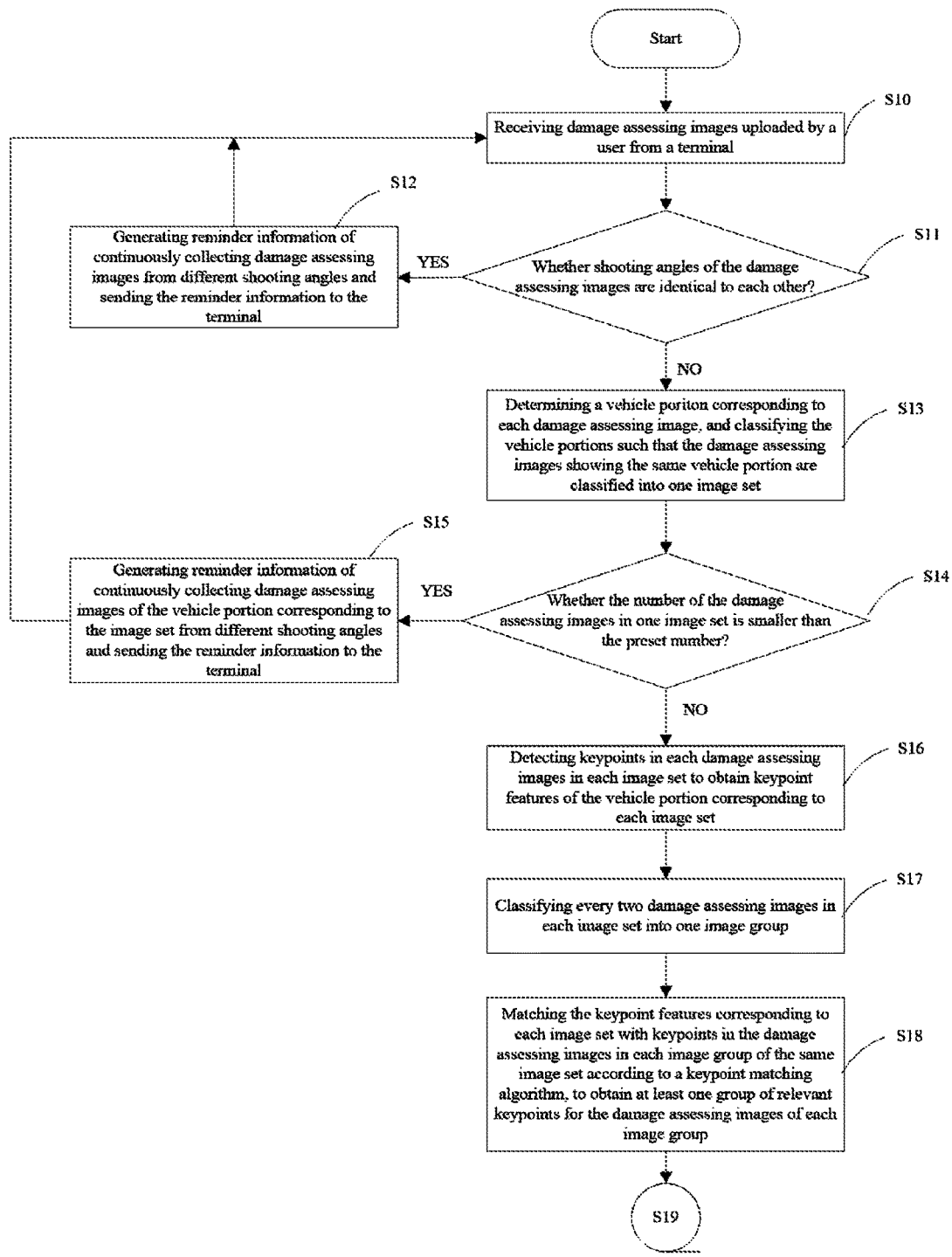
FIGS. 1A and 1B are exemplary process flow diagrams illustrating a method for realizing antifraud in insurance claim based on consistency of multiple images in accordance with an embodiment of the present disclosure.
Figure 1B:
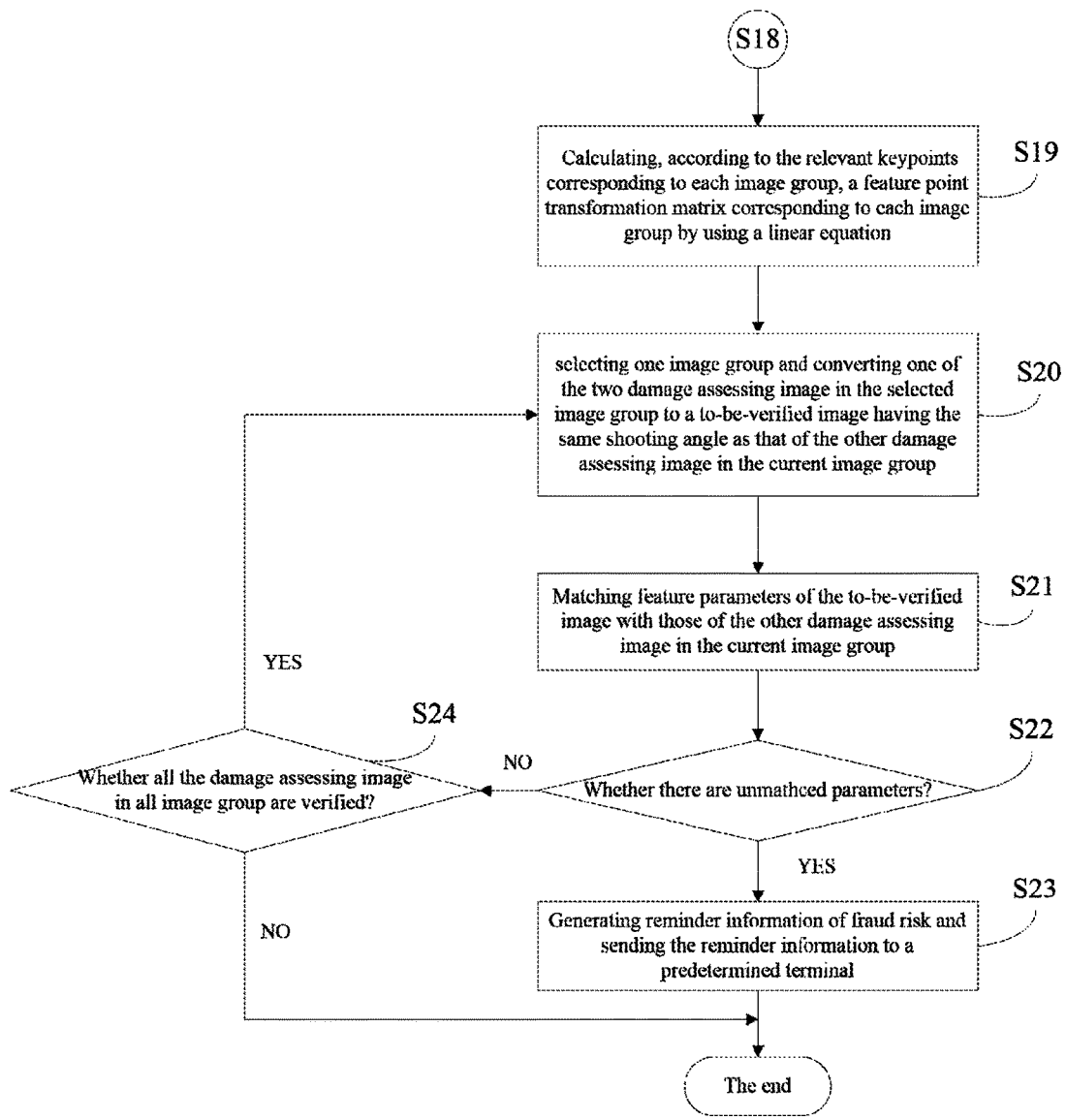

FIGS. 1A and 1B are exemplary process flow diagrams illustrating a method for realizing antifraud in insurance claim based on consistency of multiple images in accordance with an embodiment of the present disclosure. The method for realizing antifraud in insurance claim based on consistency of multiple images provided in the present disclosure is not limited to the embodiments shown in FIGS. 1A and 1B; in other embodiments, the method may include more or less steps or the consequence between the steps can be modified.

The method includes steps as follows.

Step S10, when damage assessment is required in a repairing garage for a vehicle involved in traffic accident, receiving damage assessing images from a terminal, by an image receiving module 101, uploaded by a user such as the owner of the vehicle or the repairing garage, from a terminal.

Step S11, determining, by the image receiving module 101, whether shooting angles of the damage assessing images are identical to each other or not. In some embodiments, the shooting angles of the damage assessing images can be determined using the following method: a shadow of an object in each damage assessing image is identified, a camera lens is located in right front of the shadow, and shooting angle is formed between a direction of the camera lens and a planar on which the object is located.

When the shooting angles of the damage assessing images are identical to each other, a step S12 is performed; when the shooting angles of the damage assessing images are different from each other, a step S13 is performed.

Step S12, generating reminder information, by the image receiving module 101, of continuously collecting damage assessing images from different shooting angles and sending the reminder information to the terminal. In some embodiments, if Y images of the received damage assessing images have the same shooting angles, the reminder information can be read as, for example, "Y images have the same shooting angles, please continuously collecting Y−1 images from different shooting angles respectively".

Step S13, analyzing, by a classifying module 102, vehicle portions in the damage assessing images using an analyzing model and classifying the damage assessing images, such that the damage assessing images showing the same vehicle portion can be classified into one image set.

Step S14, determining, by the classifying module 102, whether a number of the damage assessing images in each image set is smaller than a preset number, when the number of the damage assessing images in one image set is smaller than the preset number, a step S15 is performed; when the number of the damage assessing images in one image set is greater than the preset number, a step S16 is performed.

Step S15, generating, by the classifying module 102, reminder information of continuously collecting damage assessing images of the vehicle portion corresponding to the image set from different shooting angles and sending the reminder information to the terminal. In some embodiments, for example, the reminder information can be read as "Z damage assessing images of the current vehicle portion X are further required, please continuously collecting Z damage assessing images of the current vehicle portion X from other shooting angles".

Step S16, detecting, by a keypoint detecting module 103, keypoints in each damage assessing images in each image set to obtain keypoint features of the vehicle portion corresponding to each image set.

In some embodiments, the keypoints in the damage assessing image can be detected using the scale-invariant feature transform (SIFT) method. SIFT is a local feature descriptor, and SIFT keypoint features are local features of an image. In the detection of the SIFT keypoint features, a rotation, a scale, and a brightness of the image are kept unchanged, and a change of a viewing angle, an affine transformation, and a noise of the image are also kept stable in certain degrees.

Step S17, classifying, by a rebuilding module 104, every two damage assessing images in each image set into one image group.

In step S18, matching, by the rebuilding module 104, the keypoint features corresponding to each image set with keypoints in the damage assessing images in each image group of the same image set according to a keypoint matching algorithm to obtain at least one group of relevant keypoints for the damage assessing images of each image group.

In some embodiments, the keypoint matching algorithm can be the random sample consensus (RANSAC).

In some embodiments, at least one group of preset number of (e.g., 8 relevant keypoints) of relevant keypoints are matched from the damage assessing images in each image group by the rebuilding module 104. For example, an images B1 and an image B2 are classified in to one image group; at least one group of preset number of matching keypoints are respectively identified from the image B1 and the image B2, and the matching keypoints in the image B1 corresponds to the matching keypoints in the image B2 respectively, for example, the keypoints corresponding to a position in the image B1 are relevant and respectively correspond to the keypoints corresponding to the same position in the image B1.

Step S19, calculating, by the rebuilding module 104, according to the relevant keypoints corresponding to each image group, a feature point transformation matrix corresponding to each image group by using a linear equation. For example, the feature point transformation matrix corresponding to the conversion from the image B1 to the image B2 is calculated according to the relevant keypoints of the images B1, B2, such that a stereo reconstruction can be finished.

In some embodiments, the feature point transformation matrix can be Fundamental Matrix through which feature points of one image can be converted to relevant feature points of another image.

The linear equation can be:

$$X_{im,A}{}^T F X_{im,B} = 0$$

Expansion of the linear equation can be:

$$[u' \ v' \ 1] \begin{bmatrix} f_{11} & f_{12} & f_{13} \\ f_{21} & f_{22} & f_{23} \\ f_{31} & f_{32} & f_{33} \end{bmatrix} \begin{bmatrix} u \\ v \\ 1 \end{bmatrix} = 0$$

Through mathematical transformation, a feature point transformation matrix F which meets the following condition can be obtained:

$$[u'_1 u_1 u'_2 v_1 u'_1 v'_1 u_1 v'_1 v_1 v'_1 u_1 v_1 1] \begin{bmatrix} f_{11} \\ f_{12} \\ f_{13} \\ f_{21} \\ f_{22} \\ f_{23} \\ f_{31} \\ f_{32} \\ f_{33} \end{bmatrix} = 0$$

The linear equation can be solved through the eight relevant keypoints matched from the two damage assessing images in each image group to obtain a spatial transformation relationship F between the two damage assessing images in each image group.

Step S20, selecting, by a verifying module 105, one image group and converting one of the two damage assessing image in the selected image group to a to-be-verified image having the same shooting angle as that of the other damage assessing image in the current image group.

Step S21, matching, by the verifying module 105, feature parameters of the to-be-verified image with those of the other damage assessing image in the current image group.

Step S22, judging, by the verifying module 105, whether there are unmatched feature parameters. For example, if a difference between color values of two same features is greater than a threshold value, determining that the color feature parameters are unmatched; if a similarity degree between textures of two same features is less than a threshold value (e.g., 90%), determining that the texture feature parameters are unmatched.

When there are unmatched feature parameters, a step S23 is performed; when there are no unmatched feature parameters, a step S24 is performed.

Step S23, generating, by the verifying module 105, reminder information of fraud risk and sending the reminder information to a predetermined terminal. For example, the reminder information of fraud risk can be read: "the verification of the images B1 and B2 uploaded by the terminal is failed, please note the risk that the images are forgery".

Step S24, judging, by the verifying module 105, whether all the damage assessing images in all image groups are verified. If not all the damage assessing images have been verified, returned to step S20, otherwise the process ends.

Figure 2:
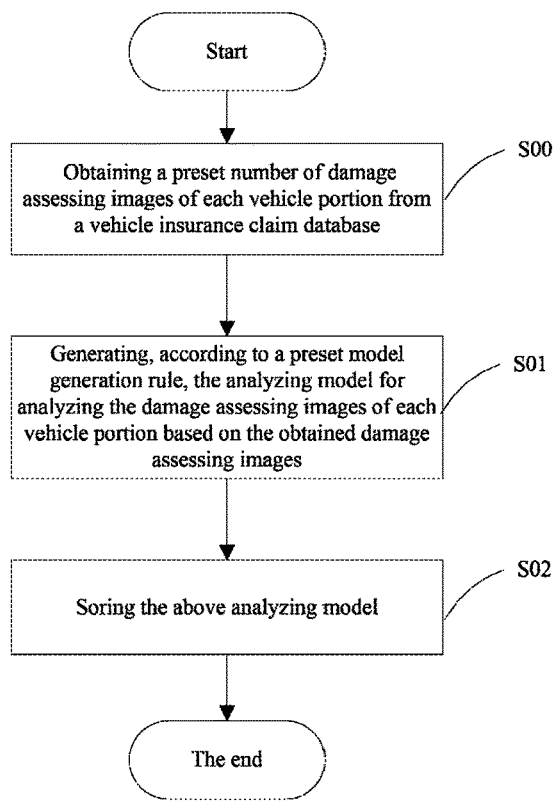
FIG. 2 is an exemplary process flow diagram illustrating a step of generating an analyzing model for analyzing images of different vehicle portions of the method of FIGS. 1A and 1B.

FIG. 2 is a flow chart of a process for generating an analyzing model for analyzing images of different vehicle portions of the method for realizing antifraud in insurance claim based on consistency of multiple images. It is noted that the flow chart of the process for generating the analyzing model is not limited to this embodiment; in other embodiments, the flow chart of the process can include more or less steps, or the sequence of the steps can be modified.

Step S00, obtaining, by a model training module 100, a preset number of damage assessing images of each vehicle portion from a vehicle insurance claim database. In some embodiments, according to a classification of each vehicle portion (for example, the classification of the vehicle portion includes a front portion of the vehicle, a side surface of the vehicle, a rear portion of the vehicle, and the whole vehicle), the model training module 100 obtains a preset number (e.g., one hundred thousand images) of damage assessing images of each vehicle portion (e.g., a front portion of the vehicle) from the vehicle insurance claim database (for example, a mapping relationship between a classification of each vehicle portion and the corresponding damage assessing image is stored in the vehicle insurance claim database; the damage assessing image refers to the image taken by the repairing garage during the damage assessment).

Step S01, generating, by the model training module 105, according to a preset model generation rule, the analyzing model for analyzing the damage assessing images of each vehicle portion based on the obtained damage assessing images. For example, based on the preset number of damage assessing images of the front portion of the vehicle, the model training module 100 generates the analyzing model for determining that the damage portion in the damage assessing images is the front portion of the vehicle; based on the preset number of damage assessing images of the side surface of the vehicle, the model training module 100 generates the analyzing model for determining that the damage portion contained in the damage assessing images is the side surface of the vehicle; based on the preset number of the damage assessing mages of the rear portion of the vehicle, the model training module 100 generates the analyzing model for determining that the damage portion in the damage assessing images is the rear portion of the vehicle; based on the preset number of the damage assessing mages of the whole vehicle, the model training module 100 generates the analyzing model for determining that the damage portion contained in the damage assessing images is the whole vehicle.

In some embodiments, the analyzing model can be a convolutional neural network (CNN) model. The preset model generation rule is: pre-processing the obtained preset number of damage assessing images of each vehicle portion to convert a format of each obtained damage assessing image to a preset format (e.g., level db format); training the CNN model using the damage assessing image with the preset format.

In some embodiments, the training of the CNN model can be as follows. Firstly, before the training begins, an initial value (e.g., from −0.05 to 0.05) of each weight in the CNN is generated randomly and evenly. The CNN model is trained by the random gradient descent method, and the whole training process can be divided into a forward propagation process and a backward propagation process. In the forward propagation process, the model training module 100 extracts samples randomly from the training data set and inputs the sample into the CNN for calculation, thereby obtaining the actual results. In the backward propagation process, the model training module 100 calculates a difference between the actual result and the expected result (that is, the label value), adjusts the value of each weight reversely using the error minimization method, and calculates an effective error generated by the adjustment of the value of each weight. The training process is performed iteratively several times (e.g., 100 times); when the effective error of the whole model is less than a preset threshold (e.g., plus or minus 0.01), the training ends.

In some embodiments, in order to ensure the recognition accuracy of the CNN model, a structure of the CNN model is divided into six layers, namely, a feature extraction layer for extracting basic features (e.g., lines or colors) from the images, a feature combination layer for extracting structural features, a feature sampling layer for identifying displacement, scaling, and twisted two-dimensional graphic features, and three sub-sampling layers for reducing the calculation size of actual features through sampling. The feature combination layer is provided behind the feature extraction layer, the feature sampling layer is provided behind the feature combination layer, and the sub-sampling layers are provided behind the feature extraction layer, the feature combination layer and the feature sample layer, respectively.

Step S02, storing, by the model training module 100, the above analyzing model.

Figure 3:
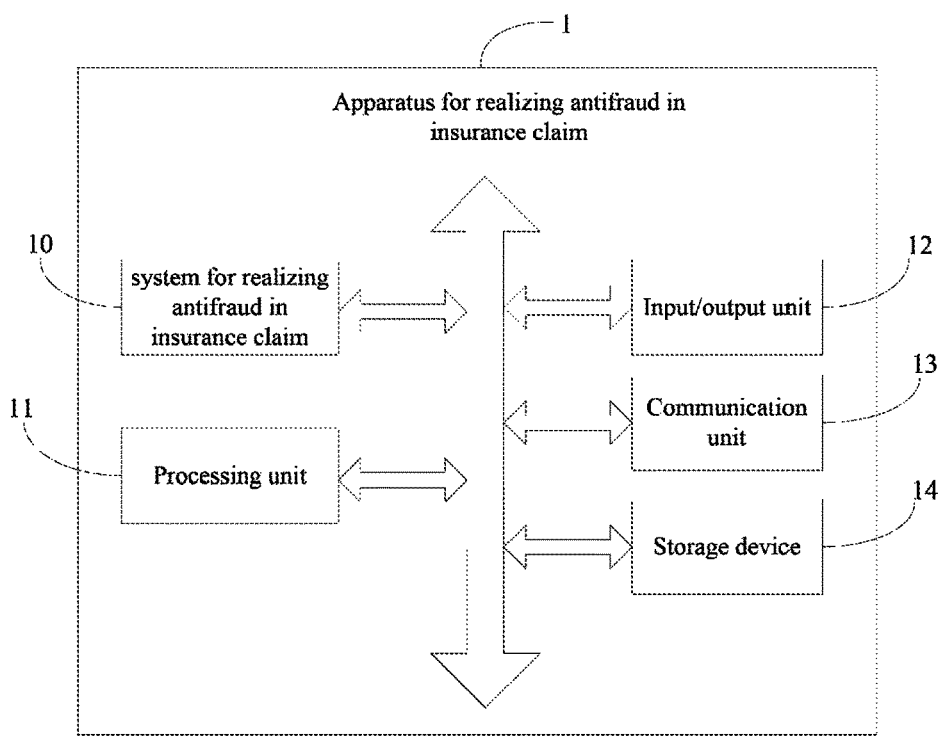
FIG. 3 is an exemplary structural schematic diagram illustrating an apparatus for realizing antifraud in insurance claim based on consistency of multiple images in accordance with a first embodiment of the present disclosure.

FIG. 3 is schematic view showing hardware structural diagram of an apparatus for realizing antifraud in insurance claim in accordance with a first embodiment of the present disclosure.

The system 10 for realizing antifraud in insurance claim based on consistency of multiple images (hereinafter "the system for realizing antifraud in insurance claim") can be installed and implemented in an apparatus 1 for realizing antifraud in insurance claim. The apparatus 1 can be an insurance claim server. The apparatus 1 includes a processing unit 11, an input/output unit 12, a communication unit 13, and a storage device 14. The system 10 is stored in the storage device 14 and is connected to the processing unit 11.

The input/output unit 12 can be one or more physical buttons and/or mouse and/or operation rods for receiving commands from a user and outputting responding data to the received commands of the apparatus 1.

The communication unit 13 is connected to one or more terminals (e.g., a mobile phone, a tablet computer) or a server for receiving damage assessing images of one or more damaged vehicle portions sent by a terminal user, for example, the owner of the vehicle or the repairing garage. In some embodiments, the communication unit 13 includes a WIFI module (the WIFI module enables the communication unit to communicate with a background server via the mobile internet), a Bluetooth module (the Bluetooth module enables the communication unit to communicate with a mobile phone via near field wireless communication), and/or a GPRS module (the GPRS module enables the communication unit to communicate with a background server via the mobile internet).

The storage device 14 can include one or more non-volatile storage media such as ROMs, EPROMs, and flash memories. The storage device 14 can be arranged inside the apparatus 1 or externally connected to the apparatus 1.

The processing unit 11 is the computing core and controlling center of the apparatus 1 for explaining computer instructions and processing data in various computer software applications.

The system 10 can be a computer software application including computer-executable program instructions. The program instructions can be stored in the storage device 14 for performing the following steps when being executed by the processing unit 11: according to multiple damage assessing images of a damaged vehicle portion having different shooting angles taken and sent by a user, such as the owner of the vehicle and/or the repairing garage, determining whether the damaged vehicle portions are consistent with each other by comparing the multiple damage assessing images and performing spatial transformations, thereby verifying whether the damage assessing images have been tampered with or not.

The processing unit 11 executes the system 10 to perform the following steps:

receiving multiple damage assessing images taken from different shooting angles uploaded by a user from a terminal;

analyzing a vehicle portion in each damage assessing image using an analyzing model and classifying the damage assessing images, such that the damage assessing image showing the same vehicle portion can be classified into one image set;

detecting keypoints in each damage assessing image in each image set to obtain keypoint features of the vehicle portion corresponding to each image set;

classifying every two damage assessing images into one image group, matching the keypoint features corresponding to each image set with the keypoints of the damage assessing images in each image group of the same image set according to a keypoint matching algorithm to obtain at least one group of relevant keypoints for the damage assessing images in each image group;

according to the relevant keypoints corresponding to each image group, calculating a keypoint transformation matrix corresponding to each image group using a linear equation, and converting one of the two damage assessing images in each image group to a to-be-verified image which has the same shooting angle as the other damage assessing image in the image group;

matching feature parameters of the to-be-verified image with those of the other damage assessing image in the image group; and generating reminder information, when the feature parameter of the to-be-verified image does not match with that of the other damage assessing image in the image group, to remind the user that the damage assessing images received from the terminal are fraudulent.

The system 10 includes a series of program instructions. When the system 10 is executed by the processing unit 11, the program instructions are executed by the processing unit 11 to cause the processing unit 11 to perform corresponding functions.

In some embodiments, the step of receiving multiple damage assessing images taken from different shooting angles uploaded by a user from a terminal includes:

identifying a shadow of an object in the damage assessing image of a vehicle and obtaining the shooting angle of the damage assessing image according to the shadow, wherein a camera lens is located in right front of the shadow and the shooting angle is formed between the direction of the camera lens and a planar on which the object is located; and generating the reminder information, when the shooting angle of the received damage assessing images of the vehicle are identical to each other, of continuously collecting the damage assessing images having different shooting angles and sending the collected damage assessing images to the terminal.

In some embodiments, the processing unit 11 executes the system 10 to further perform the following steps to generate the analyzing model:

collecting damage assessing images of different vehicle portions and marking the vehicle portion in each damage assessing image, wherein the vehicle portion may be a front portion of the vehicle, a rear portion of the vehicle; a left side of the vehicle, and a right side of the vehicle;

training a CNN model by the collected damage assessing image with the vehicle portion marked therein to obtain the analyzing model which can accurately determine the corresponding vehicle portion in the damage assessing image.

During the training of the CNN model, the CNN model is trained and evaluated multiple times using a cross-validation method, and in each time, a preset number of damage assessing images are extracted from the collected damage assessing images with the vehicle portions marked therein to be used as testing data and the remaining images of the collected damage assessing images are used as training data.

In some embodiments, the keypoints in each damage assessing image is detected using the Scale-invariant Feature Transform (SIFT) method.

In some embodiments, the keypoint matching algorithm is the Random Sample Consensus (RANSAC).

Figure 4:
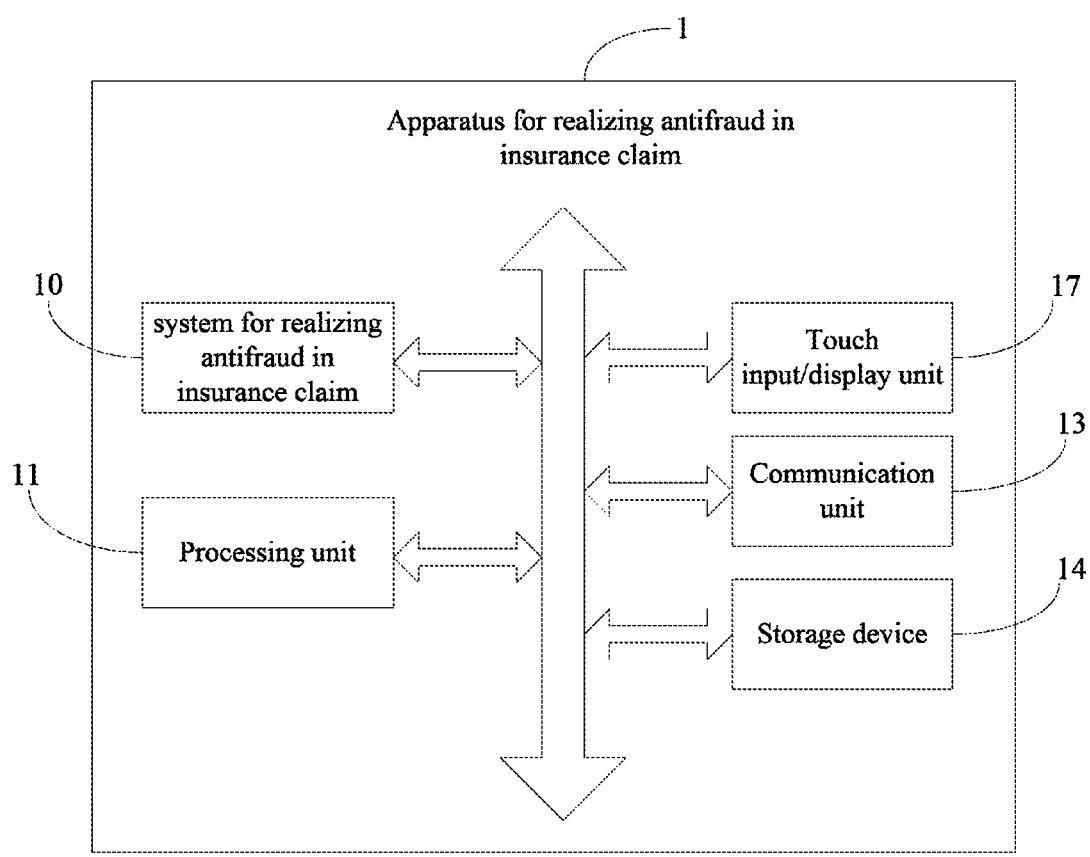
FIG. 4 is an exemplary structural schematic diagram illustrating an apparatus for realizing antifraud in insurance claim based on consistency of multiple images in accordance with a second embodiment of the present disclosure.

FIG. 4 is a schematic view showing a hardware structural diagram of an apparatus for realizing antifraud in insurance claim in accordance with a second embodiment. The difference between the apparatus of the first embodiment and that of the second embodiment lies in that the apparatus of the second embodiment includes a touch input/display unit 17 which replaces the input/output unit 12 of the apparatus of the first embodiment.

The touch input/display unit 17 is configured to provide a human-machine interaction interface, such that a user may input instructions through the human-machine interaction interface and displays the responding data to the instructions outputted by the apparatus. In some embodiments, the touch input/output unit 17 includes touch input unit and display unit; the touch input unit is configured to enable touch inputs on a touch sensing region of the human-machine interaction interface; the display unit is configured with a touch panel. The human-machine interaction interface may include one or more virtual keys (not shown) which have the same functions as those of the physical buttons of the apparatus of the first embodiment. It is understood that any other physical button and/or mouse and/or operation rod of the apparatus of the first embodiment can be replaced by the virtual key on the touch input/display unit 17 of the apparatus of the second embodiment.

In some embodiments, in order to detect whether the damaged vehicle portion shown in the multiple damage assessing images has been tampered with or not, the system 10 further performs the following functions: collection of damage assessing images and marking of the vehicle portion in each damage assessing image, deep learning and training, classification of the damage assessing images showing the same vehicle portion, detection of keypoints, stereo reconstruction, comparison of the vehicle portions and providing of the feedbacks.

In the collection of the damage assessing images and marking of the vehicle portion in each damage assessing image, different damage assessing images of the vehicle with the corresponding portions respectively marked therein are collected, for example, the vehicle portions maybe classified as a front portion of the vehicle, a rear portion of the vehicle, a left side surface and a right side surface of the vehicle. In some embodiments, the damage assessing images can be obtained from a vehicle insurance claim database. In some embodiments, the vehicle insurance claim database may store images taken by the repairing garage during the damage assessment of the vehicle, and a mapping relationship between a classification of each vehicle portion and the corresponding damage assessing image is stored in the vehicle insurance claim database.

In the deep learning and training, the CCN model is trained with the damage assessing images with the corresponding vehicle portion marked therein such that the CNN model can determine the corresponding vehicle portion shown in each damage assessing image. During the training of the CNN model, the CNN model is trained and evaluated multiple times, for example, 5 times, using a cross-validation method; 20% of the damage assessing images are extracted to be the testing data, and the other 80% of the damage assessing images are used as the training data. Through the cross-validation method, objection evaluation indexes can be obtained even when the amount of data is relatively small.

In the classification of the damage assessing images, the images showing the same vehicle portion are classified into one image set. When the damage assessing images are received from the user, the trained analyzing model determines the vehicle portion shown in each damage assessing image and classifying the damage assessing images showing the same vehicle portions into the same image set.

In the detection of keypoints, the keypoints are detected using the Scale-invariant Feature Transform (SIFT) method. method. SIFT is a local feature descriptor independent of a size, a direction, and an illumination. Since the damage assessing images may be taken from different angles and at different distances, the size and the direction of the damage assessing images may be different from each other. Through the SIFT method, the same vehicle portion such as the vehicle lamp or the vehicle door indifferent damage assessing images can be effectively detected, without being affected by the illumination and shooting angle.

In the stereo reconstruction, very two damage assessing images showing the same vehicle portion are classified into one image group, the keypoints in each damage assessing image in one image group detected using the SIFT method are matched, and the keypoints matched with the corresponding vehicle portion best are selected, such that the fundamental matrix F is calculated according to the correlation between the keypoints matched from the two damage assessing images in the current image group.

In the comparison of the damaged portion and providing of feedback, one of the two damage assessing images in the image group is converted to one having the same angle as the other damage assessing image in the image group; the features such as the colors and the textures of the two damage assessing images are matched; if one feature of one damage assessing image cannot match with the corresponding feature of the other damage assessing image in a great extent, it is determined that at least one of the two damage assessing images has been processed intentionally, at this time, the feedback is outputted to a worker to prevent fraud of vehicle insurance.

Figure 5:
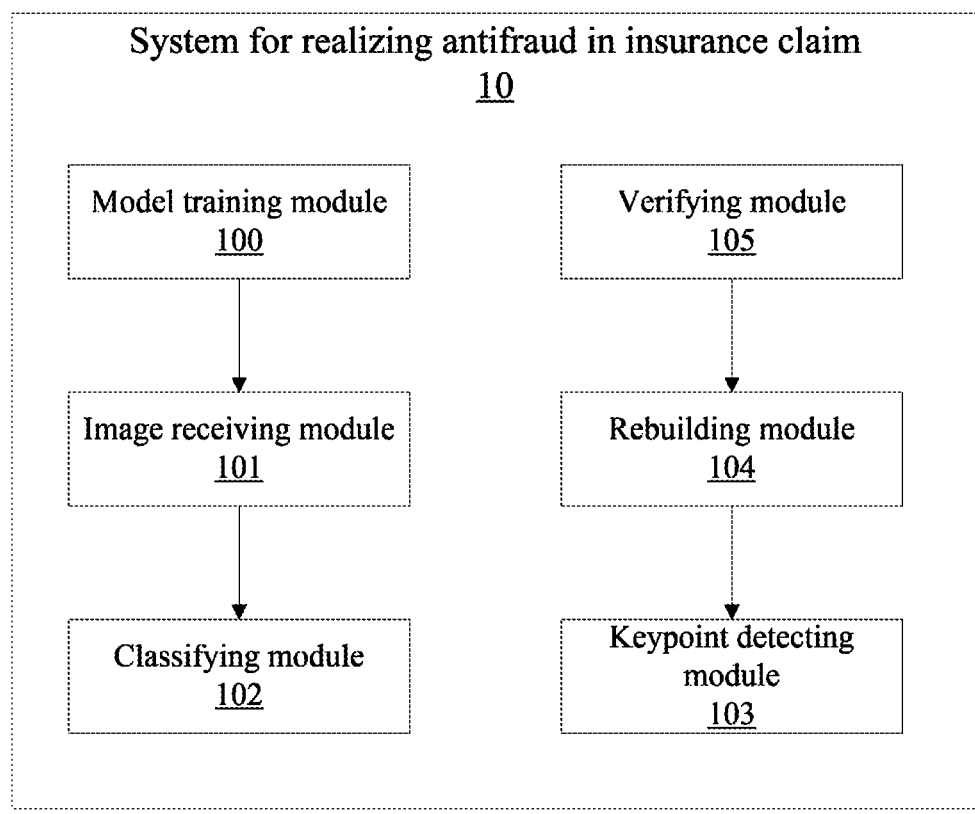
FIG. 5 is an exemplary function block diagram illustrating a system for realizing antifraud of insurance claim based on consistency of multiple images in accordance with an embodiment of the present disclosure.

FIG. 5 is a block diagram of a system for realizing antifraud of insurance claim in accordance with an embodiment of the present disclosure.

According to the functions of different blocks of instructions of the system 10, the system 10 can include multiple functional blocks. In some embodiments, the system 10 includes a model training module 100, an image receiving module 101, a classifying module 102, a keypoint detecting module 103, a rebuilding module 104, and a verifying module 105.

The model training module 100 is configured to obtain a preset number of damage assessing images of each vehicle portion from a vehicle insurance claim database, and generate, according to a preset model generation rule, an analyzing model for determining the vehicle portion in each damage assessing image based on the obtained damage assessing images of each vehicle portion, and store the analyzing model.

In some embodiments, the model training module 100, according to a classification of each vehicle portion (for example, the vehicle portion can be classified as a front portion of the vehicle, a side surface of the vehicle, a rear portion of the vehicle, and the whole vehicle), obtains a preset number (e.g., one hundred thousand images) of damage assessing images of each vehicle portion (e.g., a front portion of the vehicle) from the vehicle insurance claim database (for example, a mapping relationship between a classification of each vehicle portion and the corresponding damage assessing image is stored in the vehicle insurance claim database; the damage assessing image refers to the image taken by the repairing garage during the damage assessment of the vehicle).

The model training module 100, according to a preset model generation rule, generates the analyzing model for analyzing the damage assessing images of each vehicle portion based on the obtained damage assessing images. For example, based on the preset number of damage assessing images of the front portion of the vehicle, the model training module 100 generates the analyzing model for determining that the damaged vehicle portion in the damage assessing images is the front portion of the vehicle; based on the preset number of damage assessing images of the side surface of the vehicle, the model training module 100 generates the analyzing model for determining that the damage portion in the damage assessing images is the side surface of the vehicle; based on the preset number of the damage assessing images of the rear portion of the vehicle, the model training module 100 generates the analyzing model for determining that the damaged vehicle portion in the damage assessing images is the rear portion of the vehicle; based on the preset number of damage assessing mages of the whole vehicle, the model training module 100 generates the analyzing model for determining that the damage portion in the damage assessing images is the whole vehicle.

In some embodiments, the analyzing model can be a convolutional neural network (CNN) model. The preset model generation rule is: pre-processing the obtained preset number of damage assessing images of each vehicle portion to convert a format of each obtained damage assessing image to a preset format (e.g., level db format); training the CNN model using the damage assessing images with the preset formats.

In some embodiments, the training of the CNN model can be as follows. Firstly, before the training begins, an initial value (e.g., from −0.05 to 0.05) of each weight in the CNN is generated randomly and evenly. The CNN model is trained by the random gradient descent method, and the whole training process can be divided into a forward propagation process and a backward propagation process. In the forward propagation process, the model training module 100 extracts samples randomly from the training data set and inputs the sample into the CNN for calculation, thereby obtaining the actual results. In the backward propagation process, the model training module 100 calculates a difference between the actual result and the expected result (that is, the label value), adjusts the value of each weight reversely using the error minimization method, and calculates an effective error generated by the adjustment of the value of each weight. The training process is performed iteratively several times (for example, 100 times); when the effective error of the whole model is less than a preset threshold (for example, plus or minus 0.01), the training ends.

In some embodiments, in order to ensure the recognition accuracy of the CNN model, a structure of the CNN model is divided into six layers, namely, a feature extraction layer for extracting basic features (e.g., lines or colors) from the images, a feature combination layer for extracting structural features, a feature sampling layer for identifying displacement, scaling, and twisted two-dimensional graphic features, and three sub-sampling layers for reducing the calculation size of actual features through sampling. The feature combination layer is provided behind the feature extraction layer, the feature sampling layer is provided behind the feature combination layer, and the sub-sampling layers are provided behind the feature extraction layer, the feature combination layer and the feature sample layer, respectively.

The image receiving module 101 is configured to, when damage assessment is required in a repairing garage for a vehicle involved in traffic accident, receive the damage assessing images uploaded by the user, such as the owner of the vehicle and the repairing garage from the terminal, determine whether the shooting angles of the damage assessing images are identical to each other, and generate reminder information of continuously collecting damage assessing images from different shooting angles and send the reminder information to the terminal. For example, if Y images of the received damage assessing images have the same shooting angles, the reminder information can be read as, for example, "Y images have the same shooting angles, please continuously collecting Y−1 images from different shooting angles respectively". In some embodiments, the shooting angle of the damage assessing image can be determined in the following way: a shadow of an object in the damage assessing image of a vehicle can be identified, and a camera lens is located in right front of the shadow and the shooting angle is formed between the direction of the camera lens and a planar on which the object is located.

The classifying module 102 is configured to analyze the vehicle portion corresponding to each damage assessing image by using the analyzing model trained by the model training module 100 and classify the damage assessing images such that the damage assessing images showing the same vehicle portion can be classified into one image set. When the number of the damage assessing images is less than a preset number, the classifying module 102 generates reminder information of continuously collecting damage assessing images of the vehicle portion corresponding to the image set from different shooting angles and sends the reminder information to the terminal. In some embodiments, for example, the reminder information can be read as "Z damage assessing images of the current vehicle portion X are further required, please continuously collecting Z damage assessing images of the current vehicle portion X from other shooting angles".

The keypoint detecting module 103 is configured to detect keypoints in each the damage assessing image in each image set to obtain keypoint features of the vehicle portion corresponding to each image set. In some embodiments, the keypoints in the damage assessing image can be detected using the scale-invariant feature transform (SIFT) method. SIFT is a local feature descriptor, and SIFT keypoint features are local features of an image. In the detection of the SIFT keypoint features, a rotation, a scale, and a brightness of the image are kept unchanged, and a change of a viewing angle, an affine transformation, and a noise of the image are also kept stable in certain degrees.

The rebuilding module 104 is configured to classify every two damage assessing images into one image group using a preset rebuilding method, and match the keypoint features corresponding to each image set with the keypoints in the damage assessing images in each image group of the same image set according to a keypoint matching algorithm, thereby obtaining at least one group of relevant keypoints for the images in each image group. After that, the rebuilding module 104 calculates, according to the relevant keypoints corresponding to each image group, a keypoint transformation matrix corresponding to each image group using a linear equation.

The preset rebuilding method can be the stereo reconstruction method, and the keypoint matching algorithm can be the random sample consensus (RANSAC).

In some embodiments, the rebuilding module 104 matches at least one group of preset number (e.g., 8 relevant keypoints) of relevant keypoints for the damages assessing images in each image set. For example, an image B1 and an image B2 are classified in to one image group; at least one group of preset number of matching keypoints are respectively identified from the image B1 and the image B2, and the matching keypoints in the image B1 correspond to the matching keypoints in the image B2 respectively, for example, the keypoints in the images B1 corresponding to a position in the image B1 are relevant and respectively correspond to the keypoints corresponding to the same position in the image B2.

The rebuilding module 104, according to the relevant keypoints corresponding to each image group, calculates a feature point transformation matrix corresponding to each image group by using a linear equation. For example, the feature point transformation matrix corresponding to the conversion from the image B1 to the image B2 is calculated according to the relevant keypoints matched from the images B1, B2, such that a stereo reconstruction can be finished.

In some embodiments, the feature point transformation matrix can be the Fundamental matrix through which feature points in one image can be converted to relevant feature points in the other image.

The linear equation can be:

$$X_{im,A}{}^T F X_{im,B} = 0$$

Expansion of the linear equation can be:

$$[u'\ v'\ 1] \begin{bmatrix} f_{11} & f_{12} & f_{13} \\ f_{21} & f_{22} & f_{23} \\ f_{31} & f_{32} & f_{33} \end{bmatrix} \begin{bmatrix} u \\ v \\ 1 \end{bmatrix} = 0$$

Through mathematical transformation, a feature point transformation matrix F which meets the following condition can be obtained:

$$[u'_1\ u_1\ u'_2\ v_1\ u'_1\ v'_1\ u_1\ v'_1\ v_1\ v'_1\ u_1\ v_1\ 1]\begin{bmatrix}f_{11}\\f_{12}\\f_{13}\\f_{21}\\f_{22}\\f_{23}\\f_{31}\\f_{32}\\f_{33}\end{bmatrix}=0$$

The linear equation can be solved through the eight relevant keypoints matched from the two damage assessing images in each image group to obtain a spatial transformation relationship F between the two damage assessing images in each image group.

The verifying module 105 is configured to verify parameters of the two damage assessing image in each image group. The verifying module 105 selects one image group and converts one of the two damage assessing images in the selected image group to a to-be-verified image having the same shooting angle as that of the other damage assessing image in the current image group. The verifying module 105 matches feature parameters of the to-be-verified image with those of the other damage assessing image in the current image group. The features include color and texture, etc. The verifying module 105 judges whether there are unmatched feature parameters. For example, if a difference between color values of two same features is greater than a threshold value, the verifying module 105 determines that the color feature parameters are unmatched; if a similarity degree between textures of two same features is less than a threshold value (e.g., 90%), the verifying module 105 determines that the texture feature parameters are unmatched. When there are unmatched feature parameters, the verifying module 105 determines that the verification of the two damage assessing images in the image group fails and generates reminder information of fraud risk and sends the reminder information to the terminal. For example, the reminder information of fraud risk can be read: "the verification of the images B1 and B2 uploaded by the terminal is failed, please note the risk that the images are forgery".

The present disclosure further provides a computer-readable storage medium. The computer-readable storage medium stores one or more program instructions which can be executed by one or more processors to perform the following steps:

receiving multiple damage assessing images taken from different shooting angles uploaded by a user from a terminal;

analyzing a vehicle portion in each damage assessing image using an analyzing model and classifying the damage assessing images, such that the damage assessing image showing the same vehicle portion can be classified into one image set;

detecting keypoints in each damage assessing image in each image set to obtain keypoint features of the vehicle portion corresponding to the image set;

classifying every two damage assessing images into one image group, matching the keypoint features corresponding to each image set with the keypoints in each damage assessing image in each image group of the same image set according to a keypoint matching algorithm to obtain at least one group of relevant keypoints for the damage assessing images in each image group;

according to the relevant keypoints corresponding to each image group, calculating a keypoint transformation matrix corresponding to each image group using a linear equation, and converting one of the two damage assessing images in each image group to a to-be-verified image which has the same shooting angle as the other damage assessing image in the image group;

matching feature parameters of the to-be-verified image with those of the other damage assessing image in the image group; and generating reminder information, when the feature parameter in the to-be-verified image does not match with that of the other damage assessing image in the image group, to remind the user of frauds of the damage assessing images received from the terminal.

In some embodiments, the step of receiving multiple damage assessing images taken from different shooting angles uploaded by a user from a terminal includes:

identifying a shadow of an object in the damage assessing image of a vehicle portion and obtaining the shooting angle of the damage assessing image according to the shadow, wherein a camera lens is located in right front of the shadow and the shooting angle is formed between the direction of the camera lens and a planar on which the object is located; and generating the reminder information, when the shooting angle of the received damage assessing images of the vehicle are identical to each other, of continuously collecting the damage assessing images having different shooting angles and sending the collected damage assessing images to the terminal.

In some embodiments, the program instructions can be executed by the one or more processor to further perform the following steps:

collecting damage assessing images of different vehicle portions and marking the vehicle portions in the damage assessing images respectively, wherein the vehicle portions include a front portion of the vehicle, a rear portion of the vehicle; a left side surface of the vehicle, and a right side surface of the vehicle;

training a convolutional neural network (CNN) model by the collected images with the vehicle portion marked thereon to obtain the analyzing model which can determine the corresponding vehicle portion in each damage assessing image, wherein during the training of the CNN model, the CNN model is trained and evaluated multiple times using a cross-validation method, and in each time, a preset number of images are extracted from the collected images with the vehicle portion marked thereon to be used as testing data and the remaining images of the collected images are used as training data.

In some embodiments, the keypoints in each damage assessing image is detected using the scale-invariant feature transform (SIFT) method.

In some embodiments, the keypoint matching algorithm is the random sample consensus (RANSAC).

Those of ordinary skill in the art will appreciate that part of all of the flows implementing the above method embodiments can be accomplished by controlling the relevant hardware using programs. The programs can be stored in a computer-readable storage medium, and, when executed, can encompass the flows of the various method embodiments described above. The storage medium mentioned in the above embodiments may be a non-volatile storage medium such as a magnetic disk, an optical disk, a read-only memory (ROM), or a random access memory (RAM) or the like.

The contents described above are only preferred embodiments of the present disclosure, but the scope of the present disclosure is not limited to the embodiments. Any ordinarily skilled in the art would make any modifications or replacements to the embodiments in the scope of the present disclosure, and these modifications or replacements should be included in the scope of the present disclosure. Thus, the scope of the present disclosure should be subjected to the claims.

What is claimed is:

1. A method for identifying fraud in an insurance claim based on consistency of multiple images, comprising:
   receiving multiple damage assessing images from a user taken from different shooting angles and uploaded by the user from a terminal;
   classifying a vehicle into a plurality of vehicle portions;
   wherein, the multiple damage assessing images include a plurality of images of each vehicle portion;
   analyzing a vehicle portion captured in each damage assessing image using an analyzing model and classifying the multiple damage assessing images, such that the damage assessing images showing the same vehicle portion are classified into one image set;
   detecting keypoints in the each damage assessing image in each image set to obtain keypoint features of the vehicle portion corresponding to the image set, wherein, the keypoints are detected by a scale invariant feature transform (SIFT) method;
   classifying every two damage assessing images into one image group, matching the keypoint features corresponding to the each image set with the keypoints in the damage assessing images in each image group of the same image set according to a keypoint matching algorithm, to obtain at least one group of keypoints for the damage assessing images in the each image group;
   according to the keypoints corresponding to the each image group, calculating a keypoint transformation matrix corresponding to the each image group using a linear equation, and converting one of the two damage assessing images in the each image group to a to-be-verified image having the same shooting angle as the other damage assessing image in the image group;
   matching a feature parameter of the to-be-verified image with that of the other damage assessing image in the same image group; and
   if the feature parameter of the to-be-verified does not match with that of the other damage assessing image in the image group, generating a fraud information to remind the user of frauds of the damage assessing images received from the terminal, otherwise generating a no-fraud information.

2. The method of claim 1, wherein the receiving multiple damage assessing images taken from different shooting angles uploaded by the user from the terminal comprises:
   identifying a shadow of an object in the damage assessing image of a vehicle portion and obtaining the shooting angle of the damage assessing image according to the shadow, wherein a camera lens is located in right front of the shadow and the shooting angle is formed between the direction of the camera lens and a planar on which the object is located; and
   generating the reminder information, when the shooting angle of the received images of the vehicle are identical to each other, of continuously collecting the damage assessing images having different shooting angles and sending the collected damage assessing images to the terminal.

3. The method of claim 1, further comprising following steps for generating the analyzing model:
   collecting damage assessing images of different vehicle portions and marking the vehicle portions in the damage assessing images respectively, wherein the vehicle portions comprise a front portion of the vehicle, a rear portion of the vehicle, a left side of the vehicle, and a right side of the vehicle; and
   training a convolutional neural network model by the collected damage assessing images with the vehicle portions marked therein respectively to obtain the analyzing model which can determine the corresponding vehicle portion in each damage assessing image, wherein during the training of the convolutional neural network, the convolutional neural network is trained and evaluated multiple times using a cross-validation method, and in each time, a preset number of damage assessing images are extracted from the collected damage assessing images to be used as a testing data and the remaining damage assessing images of the collected damage assessing images are used as a training data.

4. The method of claim 1, wherein the keypoint matching algorithm is a random sample consensus.

5. A system for identifying fraud in an insurance claim, comprising:
   an image receiving module, configured to receive multiple damage assessing images from a user taken from different shooting angles and uploaded by the user from a terminal;
   a classifying module, configured to classify a vehicle into a plurality of vehicle portions and analyze a vehicle portion captured in each damage assessing image received by the image receiving module using an analyzing model and classifying the damage assessing images, such that the damage assessing images showing the same vehicle portion are classified into one image set;
   wherein, the multiple damage assessing images include a plurality of images of each vehicle portion;
   a keypoint detecting module, configured to detect keypoints in the each damage assessing image in each image set classified by the classifying module to obtain keypoint features of the vehicle portion corresponding to the image set, wherein, the keypoints are detected by a scale invariant feature transform (SIFT) method;
   a rebuilding module, configured to classify every two damage assessing images into one image group, matching the keypoint features corresponding to each image set with the keypoints in the damage assessing images in each image group of the same image set according to a keypoint matching algorithm, to obtain at least one group of relevant keypoints for the damage assessing images in the each image group, and calculate, according to the relevant keypoints corresponding to the each image group, a keypoint transformation matrix corresponding to the each image group using a linear equation; and
   a verifying module, configured to convert one of the two damage assessing images in the each image group classified by the rebuilding module to a to-be-verified image which has the same shooting angle as the other damage assessing image in the image group by using the corresponding keypoint transformation matrix, match a feature parameter of the to-be-verified image with that of the other damage assessing image in the image group, and generate a reminder information, when the feature parameter of the to-be-verified does not match with that of the other damage assessing image in the image group, to remind that user of frauds of the damage assessing images received from the terminal, otherwise generating a no-fraud information.

6. The system of claim 5, wherein the image receiving module is further configured to:
identify a shadow of an object in the damage assessing image of a vehicle portion and obtain the shooting angle of the damage assessing image according to the shadow, wherein a camera lens is located in right front of the shadow and the shooting angle is formed between the direction of the camera lens and a planar on which the object is located; and
generate the reminder information, when the shooting angle of the received images of the vehicle are identical to each other, of continuously collecting the damage assessing images having different shooting angles and send the collected damage assessing images to the terminal.

7. The system of claim 5, further comprising a module training module for training the analyzing model, and the module training module is configured to collect damage assessing images of different vehicle portions and marking the vehicle portions in the damage assessing images respectively, wherein the vehicle portions comprise a front portion of the vehicle, a rear portion of the vehicle, a left side of the vehicle, and a right side of the vehicle; and
train a convolutional neural network model by the collected damage assessing to obtain the analyzing model which can determine the corresponding vehicle portion in each damage assessing image, wherein during the training of the convolutional neural network model, the convolutional neural network model is trained and evaluated multiple times using a cross-validation method, and in each time, a preset number of images are extracted from the collected damage assessing images to be used as testing data and the remaining damage assessing images of the collected damage assessing images are used as training data.

8. The system of claim 5, wherein the keypoint matching algorithm is a random sample consensus.

9. An apparatus for identifying fraud in an insurance claim, comprising a processing unit, an input/output unit, a communication unit, and a storage unit wherein the input/output unit, the communication unit, and the storage unit are connected to the processing unit;
wherein the input/output unit is configured to receive instructions from a user and output response of the apparatus to the instructions inputted by the user;
the communication unit is configured to communicate with a pre-determined terminal or a server;
the storage device is configured to store a system for realizing antifraud in insurance claim and operation data of the system;
the processing unit is configured to execute the system to perform following steps:
receiving multiple damage assessing images taken from different shooting angles uploaded by the user from a terminal;
classifying a vehicle into a plurality of vehicle portions; wherein, the multiple damage assessing images include a plurality of images of each vehicle portion;
analyzing a vehicle portion captured in each damage assessing image using an analyzing model and classifying the damage assessing images, such that the damage assessing images showing the same vehicle portion are classified into one image set;
detecting keypoints in each damage assessing image in each image set to obtain keypoint features of the vehicle portion corresponding to the image set, wherein, the keypoints are detected by a scale invariant feature transform (SIFT) method;
classifying every two damage assessing images into one image group, matching the keypoint features corresponding to the each image set with the keypoints in the damage assessing images in each image group of the same image set according to a keypoint matching algorithm, to obtain at least one group of relevant keypoints for the damage assessing images in the each image group;
according to the relevant keypoints corresponding to the each image group, calculating a keypoint transformation matrix corresponding to the each image group using a linear equation, and converting one of the two damage assessing images in the each image group to a to-be-verified image which has the same shooting angle as the other damage assessing image in the image group;
matching a feature parameter of the to-be-verified image with that of the other damage assessing image in the same image group; and
generating a reminder information, when the feature parameter of the to-be-verified does not match with that of the other damage assessing image in the image group, to remind the user of frauds of the damage assessing images received from the terminal, otherwise generating a no-fraud information.

10. The apparatus of claim 9, wherein the receiving multiple damage assessing images taken from different shooting angles uploaded by a user from a terminal comprises:
identifying a shadow of an object in the damage assessing image of a vehicle portion and obtaining the shooting angle of the damage assessing image according to the shadow, wherein a camera lens is located in right front of the shadow and the shooting angle is formed between the direction of the camera lens and a planar on which the object is located; and
generating the reminder information, when the shooting angle of the received images of the vehicle are identical to each other, of continuously collecting the damage assessing images having different shooting angles and sending the collected damage assessing images to the terminal.

11. The apparatus of claim 9, the processing unit is further configured to execute the system to perform following steps to generate the analyzing model:
collecting damage assessing images of different vehicle portions and marking the vehicle portions in the damage assessing images respectively, wherein the vehicle portions comprise a front portion of the vehicle, a rear portion of the vehicle; a left side of the vehicle, and a right side of the vehicle; and
training a convolutional neural network model by the collected damage assessing images with the vehicle portions marked therein respectively to obtain the analyzing model which can determine the corresponding vehicle portion in each damage assessing image, wherein during the training of the convolutional neural network, the convolutional neural network is trained and evaluated multiple times using a cross-validation method, and in each time, a preset number of damage assessing images are extracted from the collected damage assessing images to be used as testing data and the remaining damage assessing images of the collected damage assessing images are used as training data.

12. The apparatus of claim 9, wherein the keypoint matching algorithm is a random sample consensus.

* * * * *